US 8,149,211 B2

United States Patent
Hayakawa et al.

(10) Patent No.: US 8,149,211 B2
(45) Date of Patent: Apr. 3, 2012

(54) DEFORMABLE SENSOR SYSTEM

(75) Inventors: Tomonori Hayakawa, Komaki (JP);
Tetsuyoshi Shibata, Kitanagoya (JP);
Rentaro Kato, Kasugai (JP); Kazunobu Hashimoto, Nagoya (JP); Yo Kato, Nagoya (JP); Toshiharu Mukai, Nagoya (JP)

(73) Assignees: Tokai Rubber Industries, Ltd., Komaki-shi (JP); Riken, Wako-shi (JP)

( * ) Notice: Subject to any disclaimer, the term of this patent is extended or adjusted under 35 U.S.C. 154(b) by 910 days.

(21) Appl. No.: 12/115,928

(22) Filed: May 6, 2008

(65) Prior Publication Data
US 2009/0120696 A1    May 14, 2009

(30) Foreign Application Priority Data
Jun. 13, 2007  (JP) ................. 2007-156769

(51) Int. Cl.
*G06F 3/045* (2006.01)
(52) U.S. Cl. .................... 345/156; 178/18.5; 345/173
(58) Field of Classification Search ......... 178/18–18.05; 345/173, 156
See application file for complete search history.

(56) References Cited

U.S. PATENT DOCUMENTS
2008/0066564 A1 * 3/2008 Hayakawa et al. ...... 73/862.628

FOREIGN PATENT DOCUMENTS
| JP | 6-281516 | 10/1994 |
| JP | 2003-98022 | 4/2003 |
| JP | 2006-53045 | 2/2006 |
| JP | 2006-284404 | 10/2006 |
| JP | 2007-510977 | 4/2007 |

OTHER PUBLICATIONS

Akihiko Nagakubo, et al. "A Tactile Sensor based on Inverse Problem Theory: The Principle", The $24^{th}$ Annual Conference of the Robotics Society of Japan, Sep. 14-16, 2006.

* cited by examiner

*Primary Examiner* — Amare Mengistu
*Assistant Examiner* — Shawna Stepp Jones
(74) *Attorney, Agent, or Firm* — Oblon, Spivak, McClelland, Maier & Neustadt, L.L.P.

(57) ABSTRACT

A deformable sensor system that can be used for pressure-distribution sensors. The deformable sensor system makes it possible to obtain a pressure distribution with a much higher accuracy, while reducing the number of electrodes. The system utilizes a deformable sensor which can detect deformation as the electric resistivity of the surface increases monotonically as an elastic deformation variation in each of the elastic deformations increases. Based on a voltage being detected by means of a detecting unit, the deformable sensor electric-resistivity variation computing unit computes the variation of the electric resistivity based on the method of least squares with a restriction condition imposed thereon. The system uses such a technology as "EIT" that is based on an inverse-problem theory. At an external-force position computing unit, a position in a pressure-receiving surface, position which receives an external force, is computed based on the computed electric-resistivity variation.

7 Claims, 8 Drawing Sheets

DEFORMABLE SENSOR SYSTEM

INCORPORATION BY REFERENCE

The present invention is based on Japanese Patent Application No. 2007-156,769, filed on Jun. 13, 2007, the entire contents of which are incorporated herein by reference.

BACKGROUND OF THE INVENTION

1. Field of the Invention

The present invention relates to a deformable sensor system that can be used for pressure-distribution sensors, and the like, for instance.

2. Description of the Related Art

Conventionally, as for a pressure-distribution sensor, there have been those which are set forth in Japanese Unexamined Patent Publication (KOKAI) Gazette No. 6-281,516, Japanese Unexamined Patent Publication (KOKAI) Gazette No. 2006-284,404 and Japanese Unexamined Patent Publication (KOKAI) Gazette No. 2003-98,022.

In the pressure-distribution sensor that is set forth in Japanese Unexamined Patent Publication (KOKAI) Gazette No. 6-281,516, electrodes, in which a large number of detector points are formed as a matrix shape, are disposed on both surfaces of a pressure-sensitive conductive elastomer sheet, or on one of the surfaces thereof. And, utilizing the fact that the electric resistivity of the pressure-sensitive conductive elastomer sheet's deformed part changes in the case where the pressure-sensitive conductive elastomer has received a pressure, a position in the pressure-sensitive conductive elastomer sensor, position which has received the pressure, is detected by electrodes that are adjacent to the said deformed part.

Moreover, in the pressure-distribution sensor that is set forth in Japanese Unexamined Patent Publication (KOKAI) Gazette No. 2006-284,404, an electrode is formed on each of a first sensor sheet and a second sheet, which are to be laminated, respectively. And, utilizing the fact that the electric resistivity declines in the case where the sensor sheets have received a pressure, a position of the pressure application is detected by the electric resistivity between the electrodes of the respective sensor sheets. Moreover, also in the pressure-distribution sensor that is set forth in Japanese Unexamined Patent Publication (KOKAI) Gazette No. 2003-98,022, electrodes are disposed on the rear-surface side of a pressure-receiving surface in substantially the same manner as the aforementioned literatures.

Specifically, in all of the pressure-distribution sensors that are set forth in the aforementioned literatures, electrodes for carrying out detection are disposed on their entire pressure-receiving surfaces. Thus, since the electrodes are disposed on the entire pressure-receiving surface, the number of the electrodes have become very enormous when enlarging the pressure-receiving surface. If such is the case, there has been such a problem that, since the wiring becomes enormous, the mountability has become poor and further the expanding/contracting property of sensor per se has been impaired.

And so, studies for solving this problem have been underway; and an achievement of the studies was made public in "'A tactile sensor based on Inverse-problem Theory: the Principle,' written by Akihiko Nagakubo and Yasuo Kuniyoshi, in 24th Academic Lecture Meeting by the Robotics Society of Japan (from Sep. 14 through 16, 2004)." In the pressure-distribution sensor that is set forth in this paper, a plurality of electrodes are installed to the outer periphery of a pressure-sensitive rubber sheet, and a resistance distribution is estimated in the pressure-sensitive rubber sheet's inside region using such a technology as "EIT" (Electric Impedance Tomography) that is based on an inverse-problem theory. And, in this inverse-problem analysis, using the least-squares method, and the like, is set forth, for instance.

However, in the inverse-problem analysis, since there is no uniqueness in solution, it is not possible to estimate an appropriate pressure distribution in the case of obtaining it based on the least-square method that is free of any restrictions.

SUMMARY OF THE INVENTION

The present invention has been done in view of such circumstances, and it is an object to provide a deformable sensor system, which makes it possible to obtain a more highly accurate pressure distribution while reducing the number of electrodes.

A deformable sensor according to the present invention comprises:

a deformable sensor having a pressure-receiving surface being capable of receiving external force, and additionally undergoing elastic deformation by means of receiving said external force onto said pressure-receiving surface, and comprising an elastic material whose electric resistivity, when all types of elastic deformations including compression deformation and tensile deformation are caused therein respectively, increases monotonically as an elastic deformation variation in each of the elastic deformations increases;

four or more electrodes being disposed on a peripheral rim of said pressure-receiving surface separately to each other;

a power-source unit for supplying a current between paired electrodes being selected from out of said electrodes;

a detecting unit being connected to paired electrodes being different from said paired electrodes to be connected to said power-source unit and being selected from out of said electrodes, thereby detecting a voltage that arises between the said paired electrodes being connected thereto;

a connection switching unit for switching said paired electrodes, which are connected to said power-source unit, one after another, and for switching said paired electrodes, which are connected to said detecting unit, one after another;

a sensitivity-matrix memory unit for storing a sensitivity matrix $S_{m,n,x,y}$, which has been computed in advance based on said voltage being detected from said detecting unit in the case of not applying said external force to said pressure-receiving surface and in the case of supplying a predetermined current from said power-source unit to said paired electrodes;

an electric-resistivity variation computing unit for computing a variation $\delta\rho(x, y)$ of said deformable sensor's electric resistivity that minimizes an evaluation function J of Equation (1) while satisfying a condition of Equation (2) in the case of applying said external force to a digitized two-dimensional plane-coordinate position (x, y) in said pressure-receiving surface, based on each of said voltages' variations $\delta\rho(m, n)$, which are detected by means of said detecting unit in the case where said paired electrodes being connected to each other are switched by means of said connection switching unit, and based on said sensitivity matrix $S_{m,n,x,y}$, which is stored in said sensitivity-matrix memory unit; and an external-force position computing unit for computing a position in said pressure-receiving surface, position which receives said external force, based on said electric-resistivity variation $\delta\rho(x, y)$ being computed by means of said electric-resistivity variation computing unit.

$$J = \|\delta V(m,n) - S_{m,n,x,y} \cdot \delta\rho(x,y)\|^2 \qquad (1)$$

However, $\delta\rho(x,y) \geq 0$  (2)

$\delta V(m,n)$: Variation of Respective Voltages being Detected by means of Detecting Unit $\delta\rho(x,y)$: Variation of Electric Resistivity of Deformable Sensor $S_{m,n,x,y}$: Sensitivity Matrix Comprising Jacobian Matrix m: Suffix Designating Electrodes' Position to which Voltage is Applied by means of Power-Source Unit n: Suffix Designating Electrodes' Position at which Voltage is Detected by means of Detecting Unit x, y: Digitized Two-Dimensional Coordinate Position in Pressure-Receiving Surface, In accordance with the deformable sensor system of the present invention, the electrodes are disposed on a periphery rim of the pressure-receiving surface. That is, compared with the case where the electrodes are disposed on the entire surface of the pressure-receiving surface like the pressure-distribution sensors that are set forth in the conventional literatures, it is possible to reduce the number of electrodes. Especially, the larger the pressure-receiving surface becomes, the more remarkable its advantageous effect becomes.

Further, the electric-resistivity variation computing unit computes a variation $\delta\rho(x, y)$ of the deformable sensor's electric resistivity that minimizes an evaluation function J of Equation (1). Specifically, the electric-resistivity variation computing unit computes the variation $\delta\rho(x, y)$ of the electric resistivity based on the method of least squares. At this moment, a restriction condition being set forth in Equation (2) is imposed thereon.

Here, in the deformable sensor that constitutes the deformable sensor system of the present invention, when all types of elastic deformations including compression deformation and tensile deformation are caused therein respectively, the electric resistivity increases monotonically as an elastic deformation variation in each of the elastic deformations increases. "All types of elastic deformations" means to include bend deformation, shear deformation and torsion deformation, not to speak of compression deformation and tensile deformation. That is, even if the deformable sensor undergoes any deformations, the deformable sensor's electric resistivity increases inevitably. For example, in each of the cases of having the deformable sensor undergone various deformations, such as in the case of having it undergone tensile deformation, in the case of having it undergone compression deformation, in the case of having it undergone bend deformation and in the case of having it undergone shear deformation, the deformable sensor's electric resistivity increases.

Moreover, in the case where tensile deformation and compression deformation occur simultaneously in the deformable sensor, the deformable sensor's electric resistivity is increased by both influences, the influence of the electric-resistivity increase resulting from the tensile deformation and the influence of the electric-resistivity increment resulting from the compression deformation. Note that, when viewing above as a phenomenon under alternate current, the fact that the deformable sensor's electric resistivity increases results in the fact that the deformable sensor's impedance increases.

Specifically, in the case of receiving external force onto the pressure-receiving surface of the deformable sensor, compared with the case where it receives no external force onto the pressure-receiving surface, the variation of the deformable sensor's electric resistivity always changes in the positive direction. And, the restriction condition of Equation (2) specifies the characteristic phenomenon to this deformable sensor.

By using the method of least squares by means of the evaluation function J of Equation (1) while imposing this restriction condition of Equation (2) thereon, it is possible to compute the variation of the deformable sensor's electric resistivity in the pressure-receiving surface's respective parts highly accurately. And, the variation of the deformable sensor's electric resistivity in the pressure-receiving surface's respective parts corresponds to the deformable sensor's deformed amount in the pressure-receiving surface's respective parts, and corresponds eventually to the external force's magnitude in the pressure-receiving surface's respective parts.

Therefore, when it is possible to compute the variation of the deformable sensor's electric resistivity in the pressure-receiving surface's respective parts, it is possible for the external-force position computing unit to compute a position in the pressure-receiving surface, position which receives the external force. That is, it enables the electric-resistivity variation computing unit to compute the variation of the deformable sensor's electric resistivity in the pressure-receiving surface's respective parts highly accurately. As a result, it is possible to compute a position in the pressure-receiving surface, position which receives the external force, highly accurately.

Here, in the elastic member of the deformable sensor of the present invention, even when the type of the external force is any types, the electric resistivity increases monotonically as an elastic deformation variation, which occurs due to that external force, increases. On the other hand, in the above-described conventional literatures, and the like, as the pressure-sensitive rubbers, those whose electric resistivities decrease when receiving external force are used. That is, a conventional pressure-sensitive conductive elastomer comprises a material whose electric resistivity is very high under no load condition, and which exhibits conductivity being accompanied by the fact that their inside conductive particles approach to each other under loaded condition so that the electric-resistivity value decreases gradually. And so, whether or not the conventional elastomer having such properties can be applied to the deformable sensor of the present invention will be investigated first of all.

When applying this conventional elastomer to the deformable sensor of the present invention, the electric resistivity of a part which receives external force comes to decrease in the case of receiving the external force onto the pressure-receiving surface. Therefore, the electric resistivity between the paired electrodes to which the detecting unit is connected changes theoretically. However, since the electric resistivity between the paired electrodes under no load condition is very high, a current, namely, the current flowing between the said paired electrodes, becomes almost zero under no load condition, even when a current is supplied between the paired electrodes that are connected to the power-source unit. Naturally, the voltage, which generates between the paired electrodes that are connected to the detecting unit, also becomes almost zero.

And, let us consider a case where the conventional elastomer undergoes compression deformation over the entire pressure-receiving surface. In this case, since the electric resistivity becomes small over the entire pressure-receiving surface, a current comes to flow in the pressure-receiving surface by supplying a current between the paired electrodes that are connected to the power-supply unit. If so, the voltage, which occurs between the paired electrodes that are connected to the detecting unit, does not become zero at all.

However, in the case of receiving external force onto a section of the pressure-receiving surface, the electric resistivity of that section alone becomes small. Therefore, in this case, since the influence of high electric-resistivity section in the other section that does not receive the external force is great, the electric resistivity between the paired electrodes that are connected to the power-source unit and to the detecting unit is very high in the substantially same manner as being under no load condition. Accordingly, in the substantially same manner as being under no load condition, the current flowing between the said paired electrodes becomes almost zero, even when a current is supplied between the paired electrodes that are connected to the power-source unit. Naturally, the voltage, which generates between the paired electrodes that are connected to the detecting unit, also becomes almost zero. Especially, in a case where a position, which receives the external force, lies in the pressure-receiving section's central sectional one, that phenomenon becomes remarkable.

However, note that, even if the electric resistivity between the paired electrodes is very large, the voltage, which generates between the paired electrodes that are connected to the detecting unit, changes theoretically when a part of surface-shaped portion's electric resistivity changes. However, since this voltage change is minute extremely, it is difficult to detect that voltage change actually.

Further, there is such a fear that the voltage, which generates between the paired electrodes that are connected to the detecting unit, is changed by means of noises. However, since the change of the voltage that generates between the said paired electrodes is minute originally, the influence of noises has become great. Therefore, due to the influence of noises, it becomes extremely difficult to detect the change of the voltage that generates between the paired electrodes, change which results only from receiving the external force onto the pressure-receiving surface.

Due to these reasons, in the case where the conventionally known elastomer is applied the deformable sensor of the present invention, it is difficult to detect a position at which the pressure-receiving surface receives the external force in. Therefore, it is hard to apply the conventionally known elastomer to the deformable sensor of the present invention.

On the contrary, in the deformable sensor system of the present invention, it is possible to detect a position in the pressure-receiving surface, position which receives the external force, highly accurately. That reason will be hereinafter explained. The deformable sensor in the present invention, as described above, comprises an elastic material whose electric resistivity changes monotonically as an elastic deformation variation increases. That is, this elastic material exhibits such an electric resistivity that is the smallest when not deforming; and enlarges when deforming. Specifically, in such a state that no external force is received onto the pressure-receiving surface of the deformable sensor (hereinafter referred to as "no load condition"), a voltage, which generates in the entire deformable sensor comprising the elastic material, becomes the smallest when supplying a current between the paired electrodes that are connected to the power-supply unit. Therefore, when supplying a current between the paired electrodes, which are connected to the power-supply unit, under no load condition, voltages, which generate between the other paired electrodes, become the smallest.

On the other hand, in such a state that external force is received onto the pressure-receiving surface of the deformable sensor (hereinafter referred to as "loaded condition"), the deformable sensor is deformed elastically by means of the external force. As a result, the electric resistivity of apart of the deformable sensor, part which has undergone elastic deformation, enlarges. Therefore, when supplying a current between the paired electrodes, which are connected to the power-supply unit, under loaded condition, a voltage, which generates between the other paired electrodes that receive the influence of the deformable sensor's part that has undergone the elastic deformation, becomes larger invariably, compared with that under no load condition.

Specifically, a voltage, which generates between the paired electrodes being connected to the detecting unit, becomes the smallest in the case where no external force is received onto the pressure-receiving surface. And, in the case where external force is received onto the pressure-receiving surface, the voltage changes so as to become larger depending on positions that receive the external force, and on magnitudes thereof. Therefore, even when a position which receives the external force lies at any locations, a change of the voltage occurs invariably between the paired electrodes that are connected to the detecting unit. Thus, the voltage, which generates between the paired electrodes that are connected to the detecting unit, changes depending on a position in the pressure-receiving surface of the deformable sensor, position which receives the external force, and on a magnitude thereof. And, depending on the position in the pressure-receiving surface of the deformable sensor, position which receives the external force, and on the magnitude thereof, the voltage, which generates between the paired electrodes being connected to the detecting unit, is affected.

And, in the present invention, compared with the case of applying the conventionally known elastomer to the deformable sensor, a range within which the voltage that generates between the paired electrodes being connected to the detecting unit changes, becomes very large. Therefore, in accordance with the present invention, it is possible to detect a position in the pressure-receiving surface, position which receives external force, securely when receiving the external force onto the pressure-receiving surface, though such a detection has been difficult contrarily in the case of applying the conventionally known elastomer to the deformable sensor. Further, in accordance with the present invention, the influence of noises becomes less likely to arise by enlarging the range, within which the voltage that generates between paired electrodes being connected to the detecting unit, changes. Therefore, it is possible to detect a position in the pressure-receiving surface, position which receives external force, highly accurately.

Moreover, it is allowable that the deformable sensor system of the present invention can further comprise an interpolated-value computing unit for computing an interpolated value, which is obtained by linearly interpolating between the electric-resistivity variations $\delta\rho(x, y)$ at neighboring positions, based on the electric-resistivity variations $\delta\rho(x, y)$ being computed by means of the electric-resistivity variation computing unit; wherein the external-force position computing unit can compute a position in the pressure-receiving surface, position which receives the external force, based on the electric-resistivity variations $\delta\rho(x, y)$ being computed by means of the electric-resistivity variation computer unit and on the interpolated value being computed by means of the interpolated-value computing unit.

Thus, with regarding to the interval as well between the electric-resistivity variations $\delta\rho(x, y)$ at neighboring positions, electric-resistivity variations $\delta\rho(x, y)$ which are computed by means of the electric-resistivity variation computing unit, it is possible to obtain the variation of the electric resistivity as an interpolated value being obtained by means of linear interpolation. That is, this makes it possible to obtain much finer data on the interval between the coordinates of the electric resistivity than the interval between the coordinates of the electric-resistivity variation $\delta\rho(x, y)$ that is computed by means of the electric-resistivity variation computing unit. Therefore, by thus using the interpolated value, it is possible to recognize a position in the pressure-receiving surface, position which receives external force, more highly accurately, compared with the case of computing the position in the pressure-receiving surface, position which receives the external force, based only on the electric-resistivity variation $\delta\rho(x, y)$ that is computed by means of the electric-resistivity variation computing unit. Further, also on the occasion of displaying the position within the pressure-receiving surface, position which receives the external force, it is possible to display the position more smoothly and highly accurately.

Moreover, in the deformable sensor system of the present invention, it is allowable that the paired electrodes, to which the power-source unit connects, can be two of the electrodes, which neighbor to each other in the peripheral rim of the pressure-receiving surface; and that the paired electrodes, to which the detecting unit connects, can be two of the electrodes, which are different from the paired electrodes being connected to the power-source unit, and which neighbor to each other in the peripheral rim of the pressure-receiving surface.

Thus, it is possible to make the influence of noises less. Specifically, it is possible to make the S/N ratio favorable.

Further, in the case where the detecting unit connects to the paired electrodes that neighbor to each other in the peripheral rim of the pressure-receiving surface, it is allowable that the electrodes can be disposed so that distances between the electrodes, which neighbor to each other in the peripheral rim of the pressure-receiving surface, are equal to each other. That is, the distances between the two electrodes, to which the detecting unit connects switchably, become equal to each other. Therefore, it is also possible to compute the sensitivity matrix $S_{m,n,x,y}$ readily, and additionally the computation of the electric-resistivity variation $\delta\rho(x, y)$ can be done readily as well.

Moreover, in the deformable sensor system of the present invention, it is allowable that the deformable sensor can comprise a plate-shaped member, and that it can have one or a plurality of the pressure-receiving surfaces in its face.

Here, the "plate shape" includes not only planar plate shapes but also curved-surface plate shapes. And, in this case, the voltage, which generates between the paired electrodes being connected to the detecting unit, becomes likely to come under the influence of external force that the pressure-receiving surface receives. Therefore, it is possible to detect an external-force application position readily. Moreover, by disposing a plurality of the pressure-receiving surfaces one after another successively, the degree of design freedom increases furthermore. In addition, it is possible to make an artificial skin for robot, for instance, out of a plurality of the pressure-receiving surfaces of the deformable sensor according to the present invention.

Moreover, in the deformable sensor system according to the present invention, it is allowable that the deformable sensor can comprise a solid three-dimensionally-shaped member, and can have a plurality of the pressure-receiving surfaces in its face; and that the external-force position computing unit can compute the external-force computing unit computes a position in the pressure-receiving surface, position which receives the external force, and the deformable sensor's internal stress distribution based on the electric-resistivity variations $\delta\rho(x, y)$ being computed by means of the electric-resistivity variation computing unit.

For example, the deformable sensor can be made so as to comprise a rectangular parallelepiped; and the six faces of the rectangular parallelepiped can make the pressure-receiving surface, respectively. Of course, the "three-dimensional shape" being mentioned herein is not limited to such a shape as a rectangular parallelepiped in which the boundary between a face and the other faces is definite, but it is possible to divide a corrugated curved surface into a plurality of faces and adapt the respective divided faces into the pressure-receiving surface, respectively. Thus, it is possible to detect an internal-stress distribution in the three-dimensional shape as well highly accurately by the electrodes alone that are disposed on the outside, in the same manner as a position in the pressure-receiving surface, position which receives external force.

Moreover, as for the elastic material of the deformable sensor in the deformable sensor system according to the present invention, it is allowable to use such an elastic material, which comprises an elastomer being made up of a predetermined rubber, and spherical conductive fillers being compounded in said elastomer in substantially a single-particulate state and with a high filling rate. Here, "substantially single-particulate state" refers to such an instance that, when the entire mass of the conductive fillers are taken as 100% by mass, 50% by mass or more of them exist not as agglomerated secondary particles, but as individual primary particles. Moreover, "being compounded with a high filling rate" refers to such an instance that the conductive fillers are compounded in such a state that can be approximated to closest packing.

Thus, by means of the fact that the conductive fillers are compounded with a high filling rate (a state that can be approximated to closest packing), and the fact that they exist as primary particles in the elastomer, three-dimensional conductive paths, which result from the conductive fibers, are formed when the deformable sensor is under no load condition. On the contrarily, when the deformable sensor is under loaded condition, the deformable sensor undergoes elastic deformation. And, since the conductive fillers are compounded in such a state that can be approximated close to closest packing, the conductive fillers repel to each other by means of this elastic deformation, and the states of contact between the conductive fibers change to each other. As a result, the three-dimensional conductive passes at the time of being under no load condition have collapsed, and thereby the electric resistivity increases. That is, the said elastic material can have such a property that the electric resistivity increases as the elastic deformation variation increases.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for the purpose of illustration only and not intended to limit the scope of the appended claims.

Hereinafter, the present invention will be explained in more detail while naming examples.

First Example

(1) Overall Construction of Deformable Sensor System

Figure 1:
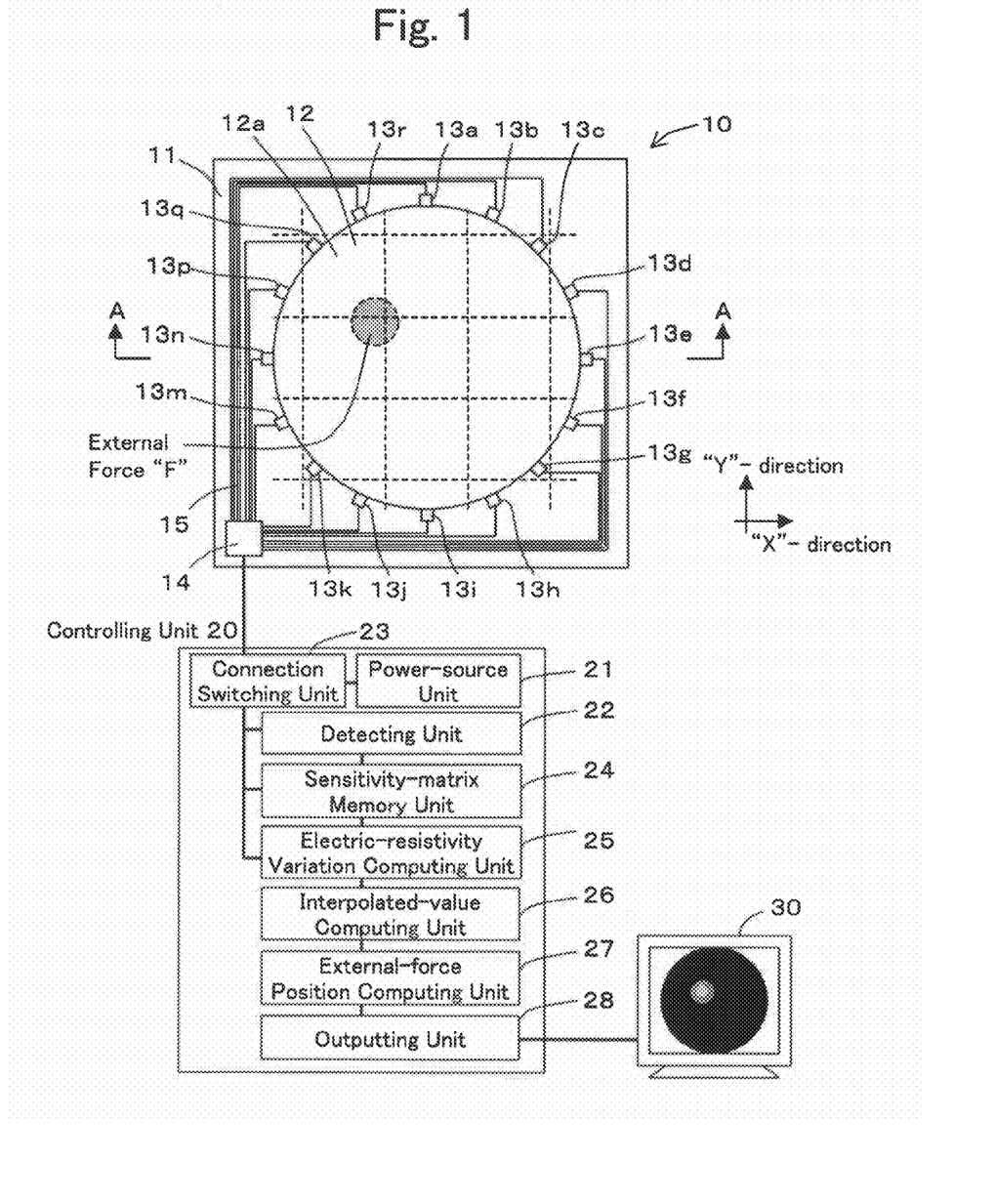
FIG. 1 is an overall construction of a deformable sensor system.
Figure 2:
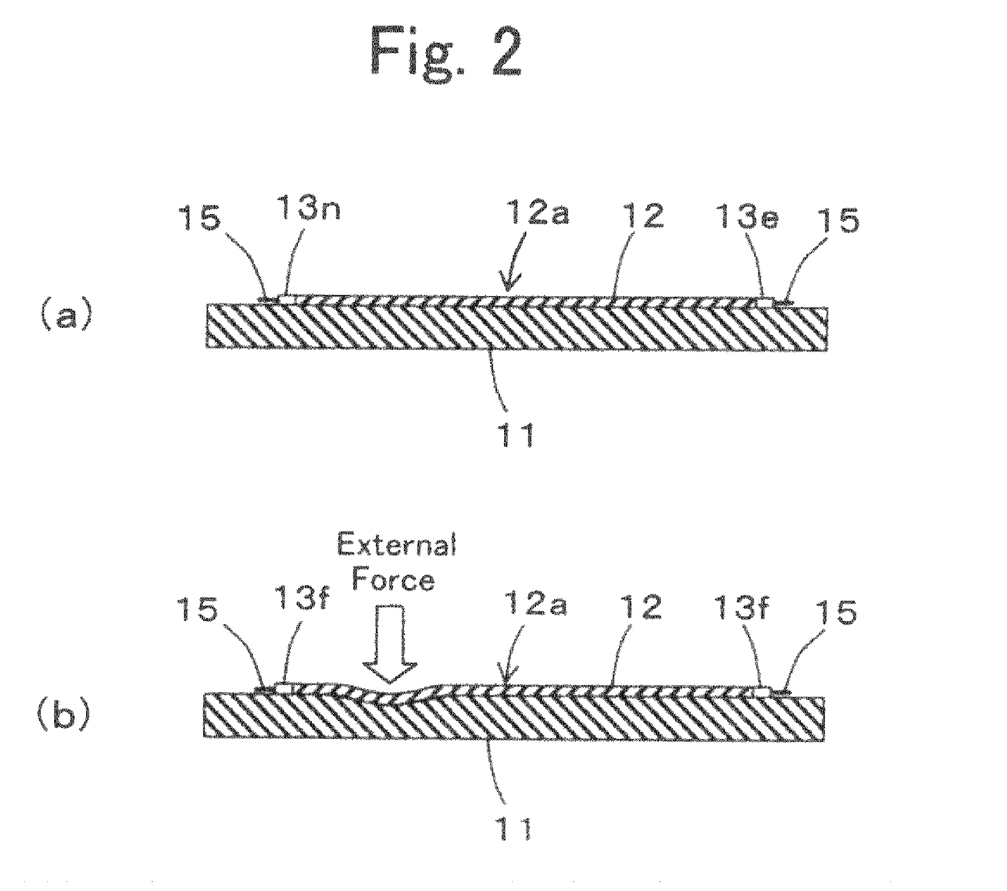
FIG. 2 is "A"-"A" cross-sectional diagrams of FIG. 1 under no load condition and under loaded condition, respectively.

An overall construction of a deformable sensor system according to the present example will be explained with reference to FIG. 1 and FIG. 2. FIG. 1 illustrates an overall construction diagram of the deformable sensor system. FIG. 2 (a) illustrates an "A"-"A" cross-sectional diagram of FIG. 1 in such a state that a deformable sensor 12 does not receive any pressurizing external force "F" (no load condition). FIG. 2 (b) illustrates another "A"-"A" cross-sectional diagram of FIG. 1 in such a state that the deformable sensor 12 receives a pressurizing external force "F" (loaded condition).

As illustrated in FIG. 1, the deformable sensor system comprises a sensor structure 10, a controlling unit 20, and a monitor 30. The sensor structure 10 comprises a boarding plate 11, the deformable sensor 12, sixteen pieces of electrodes 13a-13r, a connector 14, and wiring 15. The boarding plate 11, as illustrated in FIG. 1 and FIGS. 2(a) and (b), comprises a squared plate-shaped member, and comprises a foamed material with elasticity or a cushioning material. Specifically, when the boarding plate 11 is pressed at the top surface (the upper side surface in FIG. 2) as shown in FIG. 2(b), a pressed part deforms as a concaved shape is pressed. The boarding plate 11 is disposed on a planar base, for instance.

In the present example, as for the deformable sensor 12, a resistance-incremental type sensor is used. Concretely speaking, the deformable sensor 12 comprises a rubber elastic material whose electric resistivity, when all types of elastic deformations including compression deformation and tensile deformation are caused therein respectively, increases monotonically as an elastic deformation variation in each of the elastic deformations increases. This deformable sensor 12 is formed as a circular flat-plate shape, and is disposed so as to be superimposed onto the top surface of the boarding plate 11.

Here, the top surface of the deformable sensor 12, namely, the flat plate-shaped member's widening surface makes a pressure-receiving surface 12a, which is capable of receiving a pressing external force "F" that acts downward in FIGS. 2(a) and (b). That is, the pressure-receiving surface 12 of the deformable sensor 12a, when receiving the pressing external force "F" acting in its normal direction, undergoes a bend elastic deformation as shown in FIG. 2(b) so that, of the deformable sensor 12, a part, which receives the said pressing external force "F," curves toward the lower side in FIG. 2 (b). Note that the details of the rubber elastic material of the deformable sensor 12 will be explained in the section of later-described "(2) Explanation on Material of Deformable Sensor 12."

Sixteen pieces of the electrodes 13a-13r are bonded onto the peripheral rim of the pressure-receiving surface 12a by means of vulcanization bonding. And, these electrodes 13a-13r are disposed so as to extend (or protrude) toward the outside from their connected points (or bonded points) onto the periphery rim of the pressure-receiving surface 12a. Further, when being viewed in the direction of the pressing external force that the deformable sensor 12 receives, the electrodes 13a-13r are disposed so as not to be superimposed with respect to the pressure-receiving surface 12a. Furthermore, these sixteen the electrodes 13a-13r are disposed to be away from each other so that the distances between the electrodes, which neighbor to each other in the peripheral rim of the pressure-receiving surface 12a, are equal. That is, the electrodes 13a-13r are disposed at intervals of 30° in the peripheral rim of the pressure-receiving surface 12a.

The connector 14 is a member for electrically connecting the above to a later-described controlling unit 20. This connector 14 is disposed at, of the top surface of the boarding plate 11, the lower left corner in FIG. 1, and more outward than the peripheral rim of the deformable sensor 12. That is, the connector 14 is disposed at a position that separates off with respect to the deformable sensor 12. The wiring 15 is connected to each of the electrodes 13a-13r at one of its ends, and is connected to the connector 14 at the other one of its ends.

The controlling unit 20 computes a position in the pressure-receiving surface 12a, position which has received the pressing external force "F," based on information that is detected when an alternate current is supplied to the deformable sensor 12. This controlling unit 20 outputs the computed result to the monitor, namely, the computed position in the pressure-receiving surface 12a, position which has received the pressing external force "F," thereto. On the monitor 30, a plane, which corresponds to the pressure-receiving surface 12a of the deformable sensor 12, is displayed; it displays positions, which have received the pressing external force "F," using various colors, or displays them using color tones. Note that the details of the controlling unit 20 will be explained in the section of later-described "(4) Detailed Explanation on Controlling Unit 20."

(2) Explanation on Material of Deformable Sensor 12

Figure 3:
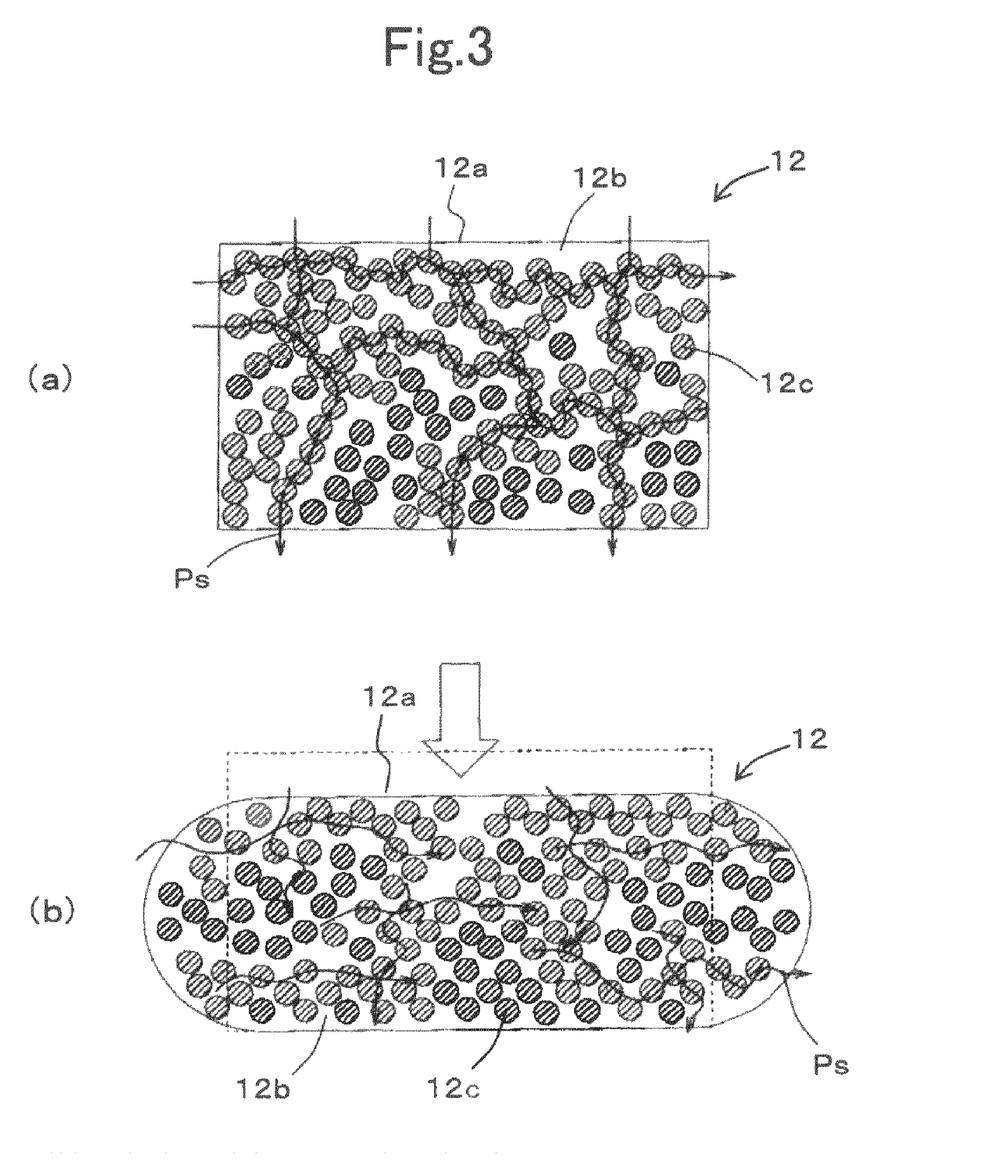
FIG. 3 is cross-sectional schematic diagrams of a deformable sensor 12 under no load condition and under loaded condition, respectively.

Next, the rubber elastic material that is used for the deformable sensor 12 will be explained with reference to FIG. 3, namely, a rubber elastic material, whose electric resistivity, when all types of elastic deformations including compression deformation and tensile deformation are caused therein respectively, increases monotonically as an elastic deformation variation in each of the elastic deformations increases, will be explained hereinafter. FIG. 3(a) illustrates a cross-sectional schematic diagram of the deformable sensor 12 under no load condition; and FIG. 3(b) illustrates a cross-sectional schematic diagram of the deformable sensor 12 under loaded condition. Note that, in FIG. 3(b), a configuration of the deformable sensor 12 with no load being applied is shown with the dashed lines.

This rubber elastic material of the deformable sensor 12 comprises an elastomer 12b being made up of predetermined rubber, and spherical conductive fillers 12c that are compounded in the elastomer in a substantially single-particulate state and with a high filling rate. Here, the elastomer 12 comprising a predetermined rubber, per se, exhibits insulatability. Moreover, what the phrases, "substantially single-particulate state" and "being compounded with a high filling rate," mean has been described above.

And, under no load condition, many of the conductive fillers 12c exist in the elastomer 12b in a primary-particulate state as illustrated in FIG. 3(a). Moreover, the filling rate of the conductive fillers 12c is high, and thereby they are compounded in such a state that can be approximated to closest packing. Thus, under no load condition, three-dimensional conductive paths "Ps," which result from the conductive fillers 12c, are formed in the deformable sensor 12. Therefore, under no load condition, the electric resistivity of the deformable sensor 12 becomes smaller.

On the other hand, in the case of receiving the external force "F" (pressing external force, for instance) onto the pressure-receiving surface 12a of the deformable sensor 12 (loaded condition), the deformable sensor 12 undergoes elastic deformation as illustrated in FIG. 3(b). Here, since the conductive fillers 12c are compounded in such a state that can be approximated to closet packing, there is little space in which the conductive fillers 12c can move. Therefore, when the deformable sensor 12 undergoes elastic deformation, the conductive fillers 12c repel to each other, and thereby the contact states between the respective conductive fillers 12c change. As a result, the three-dimensional conductive paths "Ps," which have been formed under no load condition, collapse, and thereby the electric resistivity of the deformable sensor 12 increases.

Here, in the deformable sensor 12, as the compounding amount of the conductive fillers 12 is increased with respect to the elastomer 12b, the electric resistivity of the deformable sensor 12 lowers. Concretely speaking, let us consider a case of compounding the conductive fillers 12 in a predetermined amount of the elastomer 12c, the electric resistivity of the deformable sensor 12 shows a large value under such a condition that the compounding amount of the conductive filler 12c is less. In other words, the electric resistivity of the deformable sensor 12 in this case is virtually equal to the electric resistivity of the elastomer 12b, per se, under such a condition that the conductive fillers 12c are not compounded.

And, when the compounding amount of the conductive fillers 12c is increased so that their compounding amount reaches a predetermined volumetric fraction, the electric resistivity of the deformable sensor 12 drops sharply so that an insulator-conductor transition occurs (first inflection point). The compounding amount of the conductive fillers 12c at this first inflection point is referred to as a critical volumetric fraction. Moreover, when the compounding amount of the conductive fillers 12c is further increased, the variation of the electric resistivity of the deformable sensor 12 becomes small starting at a predetermined volumetric fraction so that the change of the electric resistivity saturates (second inflection point). The compounding amount of the conductive fillers 12c (% by volume) at this second inflection point is referred to as a saturated volumetric fraction.

Such a change of the electric resistivity of the deformable sensor 12 is called as a "percolation curve," and is believed to occur because the conductive paths "Ps" (shown in FIG. 3(a)), which result from the conductive fillers 12c, are formed in the elastomer 12b. And, in order that the three-dimensional conductive paths "Ps" can be formed based on the fact that the conductive fillers 12c are compounded in such a state that can be approximated to closest packing, it is allowable that the saturated volumetric fraction of the conductive fillers 12c in the elastomer 12b can be 35% by volume or more under no load condition. This is due to the fact that the conductive fillers 12c exist stably in the elastomer 12b in a substantially single-particulate state so that a state that can be approximated to closest packing is materialized, because of the fact that the saturated volumetric volume is large as much as 35% by volume or more.

Accordingly, in the deformable sensor 12, when the entire volume is taken as 100% by volume, it is possible to induce an incremental behavior of the electric resistivity with respect the external force "F" by adapting the filling rate of the conductive fibers 12 into being from 30% by volume or more, which can be approximated to the saturated volumetric fraction, to 65% by volume or less.

On the other hand, when the conducive fibers 12c agglomerate to form agglomerates due to such reasons that the particle diameters of the conductive fillers 12c are small and the compatibility between the conductive fillers 12c and the elastomers 12b is poor, and the like, one-dimensional conductive paths "Ps" are likely to be formed. If such is the case, the critical volumetric fraction of elastomer composition becomes small comparatively to such an extent as 20% by volume. Likewise, the saturated volumetric fraction becomes small comparatively. To put it differently, when the critical volumetric fraction and saturated volumetric fraction are small, the conductive fillers 12c are less likely to exist as primary particles, but are likely to form secondary particles (or agglomerates). Hence, in this case, it is hard to compound the conductive fillers 12c in a large amount in the elastomer 12c. That is, it is hard to compound the conductive fillers 12c in such a state that can be approximated to closest packing. Moreover, this is because the change of conductivity with respect to deformation becomes less, due to the fact that, when the conductive fillers 12c whose particle diameters are small are compounded in a large amount, agglomerated structures grow three-dimensionally.

Here, a specific example of the rubber elastic material, which forms the deformable sensor 12, will be named hereinafter. First of all, 85 parts by mass of oil-extended EPDM ("ESPRENE (Trademark) 6101" produced by SUMITOMO KAGAKU Co., Ltd.), 34 parts by mass of oil-extended EPDM ("ESPRENE 601" produced by SUMITOMO KAGAKU Co., Ltd.), 30 parts by mass of EPDM ("ESPRENE 505" produced by SUMITOMO KAGAKU Co., Ltd.), zinc oxide (produced by HAKUSUI KAGAKU KOGYO Co., Ltd.), and 1 part by mass of stearic acid ("LUNAC (Trademark) S30" produced by KAOH Co., Ltd.), and 20 parts by mass of paraffin-system process oil ("SUNPER (Trademark) 110" produced by NIHON SUN OIL Co., Ltd.) were kneaded with a roll kneader.

Next, 270 parts by mass of carbon beads ("NIKABEADS ICB0520" produced by NIHON CARBON Co., Ltd., the average particle diameter: about 5 μm, and D90/D10=3.2 in the grain-size distribution) were added to the above, were mixed with the roll kneader, and were dispersed therein. Further, as vulcanization facilitating agents, 1.5 parts by mass of zinc dimethyldithiocarbamate ("NOCCELER (trademark) PZ-P" produced by OHUCHI SINNKO KAGAKU Co., Ltd.), 1.5 parts by mass of tetramethylthiuramdisulfide ("SUNCELLER (trademark) TT-G" produced by SANSHIN KAGAKU Co., Ltd.), 0.5 parts by mass of 2-mercaptobenzothiazle ("NOCCELER M-P" produced by OHUCHI SINNKO KAGAKU Co., Ltd.), and 0.56 parts by mass of sulfur ("SUNFAX T-10" produced by TSURUMI KAGAKU KOGYO Co., Ltd.) were added to the above, were mixed with the roll kneader, and were dispersed therein, thereby preparing an elastomer composition.

In the percolation curve of this elastomer composition, the critical volumetric fraction was about 43% by volume, and the saturated volumetric fraction was about 48% by volume. Next, the elastomer composition was molded to a predetermined size (a circular shape in the present example), and then the deformable sensor 12 was molded at a predetermined temperature by means of press vulcanization. In the molded deformable sensor 12, the filling rate of the carbon beads was about 48% by volume in the case of taking the volume of the deformable sensor 12 as 100% by mass.

(3) On Change Characteristics of Electric Resistivity of Deformable Sensor 12

Figure 4:
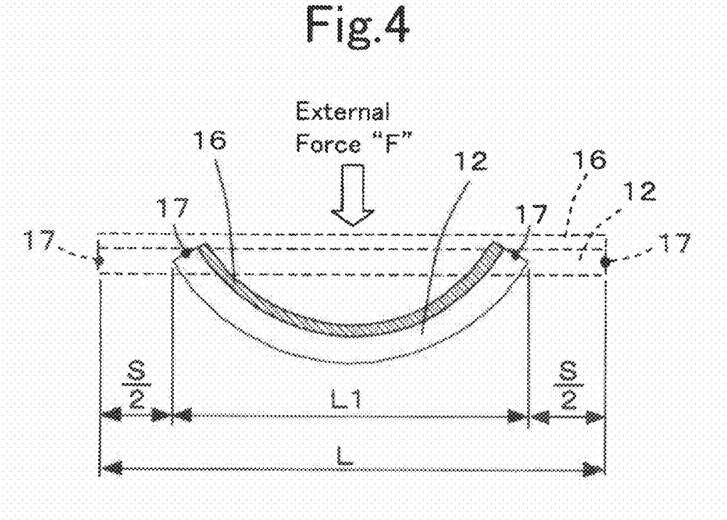
FIG. 4 is a diagram for illustrating a state in which the deformable sensor 12 has undergone bending deformation.
Figure 5:
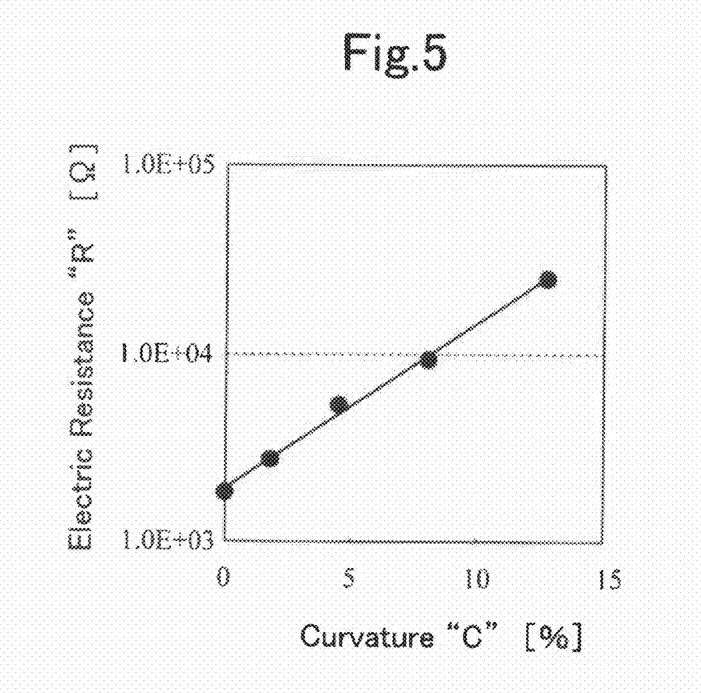
FIG. 5 is a diagram for illustrating a variation characteristic of the deformable sensor 12's electric resistivity with respect to its curvature "C" when the deformable sensor 12 has undergone bend deformation.

Next, change characteristics of the electric resistivity of the deformable sensor 12, which was molded as described above, will be explained with reference to FIG. 4 through FIG. 7. First of all, with reference to FIG. 4 and FIG. 5, a change characteristic when the deformable sensor 12 undergoes bend deformation will be explained. FIG. 4 is a diagram that illustrates a state in which the deformable sensor 12 has underwent bent deformation. FIG. 5 is a diagram that illustrates a change characteristic of the electric resistance of the deformable sensor 12 with respect to the curvature "C" thereof when the deformable sensor 12 has underwent bent deformation. Here, in order to explain a change characteristic of the electric resistance of the material itself for the deformable sensor 12, the configuration of the deformable sensor 12 is adapted, contrary to the above-described circular configuration, into being a continuously-long plate shape (or rectangular plate shape).

First of all, as illustrated in FIG. 4, electrodes 17 were disposed at the opposite ends of the continuously-long plate-shaped deformable sensor 12. The electrodes 17 at the opposite ends were adapted into being an identical configuration. Further, by means of bonding a resin 16, which was made from polyimide, onto one of the planes of the continuously-long plate-shaped deformable sensor 12, a unidirectional elongation/contraction deformation of the deformable sensor 12 was restrained. If such is the case, let us consider a condition under which the entire deformable sensor 12 undergoes bend elastic deformation so as to curve toward the lower side in FIG. 4 by applying an external force "F" to the central section of the deformable sensor 12 in such a direction that the polyimide resin 16, which is bonded on the deformable sensor 12, is attached. In this instance, when letting the longitudinal length of the deformable sensor 12 under no load condition be "L"; the interval distance between the opposite ends of the deformable sensor 12 under loaded condition be "L1"; and the difference between "L" and "L1" be the bend strain distance "S"; the curvature "C" is defined by means of following equation (3).

$$C = \frac{S}{L1} \times 100 \quad (3)$$

C: Curvature [%]
S: Bend Distortion Distance [mm]
L1: Interval Distance between Opposite Ends of Deformable Sensor 12 under Loaded Condition [mm]

And, under such a condition that the curvature "C" was changed by varying the pressing external force "F" properly, the electric resistance between the electrodes 17 on that occasion was measured. This result is illustrated in FIG. 5, namely, the electric resistance between the electrodes 17 increased monotonically as the curvature "C" increased. From this fact, it is possible to say that the greater the elastic deformation variation of the deformable sensor 12 is, the more likely it is that the electric resistivity increases monotonically.

Figure 6:
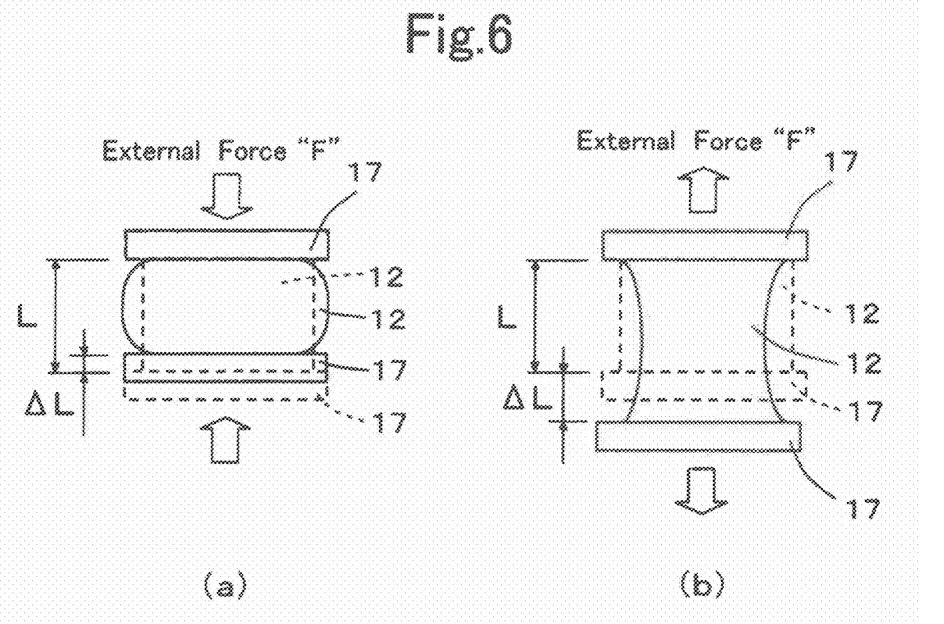
FIG. 6 is a diagram for illustrating a state in which the deformable sensor 12 undergoes compression deformation or tensile deformation.
Figure 7:
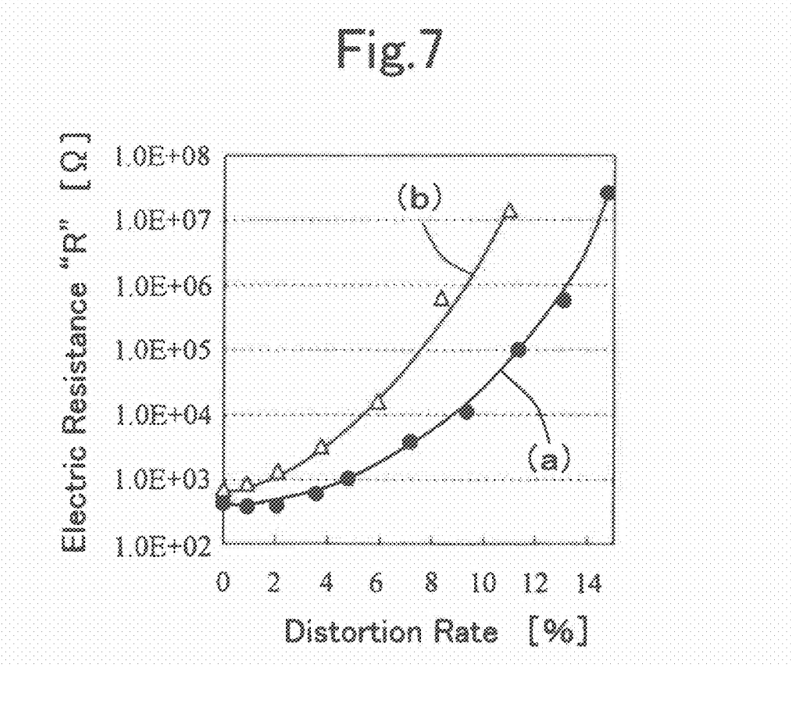
FIG. 7 is a diagram for illustrating a variation characteristic of the deformable sensor 12's electric resistivity with respect to its distortion rate when the deformable sensor 12 has undergone compression deformation or tensile deformation.

Next, with reference to FIG. 6 and FIG. 7, a deformation characteristic when the deformable sensor 12 undergoes compression deformation or tensile deformation will be explained. FIG. 6(a) is a drawing that illustrates a state in which the deformable sensor 12 undergoes compression deformation. FIG. 6(b) is a drawing that illustrates a state in which the deformable sensor 12 undergoes tensile deformation. FIG. 7 is a drawing that illustrates a variation characteristics of the electric resistance of the deformable sensor 12 with respect to the distortion rate thereof. In FIG. 7, the black circles represent a characteristic in tensile deformation, and the blank triangles represent a characteristic in compression deformation. Note herein that the configuration of the deformable sensor 12 is adapted into being a columnar shape.

As illustrated in FIG. 6, electrodes 17 are disposed at the upper and lower ends of the column-shaped deformable sensor 12. These upper-end and lower-end electrodes 17 are adapted into being an identical configuration. And, as for the case where the deformable sensor 12 undergoes compression deformation, such a condition will be considered that an up/down-direction compression force "F" is applied thereto as shown in FIG. 6(a). Moreover, as for the case where the deformable sensor 12 undergoes tensile deformation, such a condition will be considered that a tensile force "F" is applied thereto in the up/down direction as shown in FIG. 6(b).

And, under such a condition that a distortion rate was changed by varying the compression or tensile forces "F" properly, the electric resistance between the electrodes 17 on that occasion was measured. Here, the strain ($=\Delta L/L$) is the up/down-direction compression deformation variation or tensile deformation variation $\Delta L$, which results from applying the compression force or tensile force thereto, with respect to the up/down length "L" of the deformable sensor 12 under such a condition that the compression force or tensile force is not applied thereto. Moreover, the distortion rate is one that is obtained by multiplying the strain by a factor of 100, that is, $\Delta L/L \times 100$.

The measurement result when undergoing the compression deformation was as follows: as shown with the black circles in FIG. 7, the resistance between the electrodes 17 increased monotonically as the distortion rate increased. From this fact, it is possible to say that the greater the elastic deformation variation, which results from the compression deformation of the deformable sensor 12, is, the more likely it is that the electric resistivity increases monotonically. Moreover, the measurement result when undergoing the tensile deformation was as follows: as shown with the blank triangles in FIG. 7, the resistance between the electrodes 17 increased monotonically as the distortion rate increased. From this fact, it is possible to say that the greater the elastic deformation variation, which results from the tensile deformation of the deformable sensor 12, is, the more likely it is that the electric resistivity increases monotonically.

Note that, as for the types of elastic deformations, there are compression deformation, tensile deformation, bend deformation, shear deformation, and torsion deformation. And, with regard to the compression deformation, tensile deformation and bend deformation, it is apparent that, as described above, the greater the elastic deformation variation is, the more likely it is that the electric resistivity increases monotonically. With regard to the other deformations as well, such as shear deformation and torsion deformation, the greater the elastic deformation variation is, the more likely it is that the electric resistivity increases monotonically.

This issue will be hereinafter explained. When viewing the deformable sensor 12 as a microregion, even if the deformable sensor 12 undergoes any elastic deformation, it comes to always undergo compression deformation or tensile deformation. And, when the deformable sensor 12 undergoes compression deformation and when it undergoes tensile deformation, in both cases, as its elastic deformation variation increases, the electric resistivity increases monotonically as having been described so far. That is, in bend deformation, shear deformation and torsion deformation, when observing them in a microregion of the deformable sensor 12, since the deformable sensor 12 undergoes compression deformation or tensile deformation in all of the microregions as its elastic deformation variation increases, the electric resistivity invariably comes to increase monotonically.

(4) Detailed Construction of Controlling Unit 20

The controlling unit 20 comprises a power-source unit 21, a detecting unit 22, a connection switching unit 23, a sensitivity-matrix memory unit 24, an electric-resistivity variation computing unit 25, an interpolated-value computing unit 25, an external-force position computing unit 27, and an outputting unit 28. When explaining the respective units of the controlling unit 20, in addition to FIG. 1, FIG. 8 will be referred to as well.

The power-supply unit 21 has two pieces of power-source terminals, and turns into such a state that it is connected electrically to each of the electrodes 13a through 13r by way of the connector 14 and wiring 15. However, the power-supply unit 21 turns into such a state that it is connected electrically to the two pieces electrodes (paired electrodes), which are selected from out of the electrodes 13a through 13r by means of the later-described connection switching unit 23, thereby supplying an alternate current between the said paired electrodes. The two electrodes (paired electrodes), which are connected to the two the power-source terminals of this power-supply unit 21 simultaneously, are two electrodes that neighbor to each other in the peripheral rim of the pressure-receiving surface 12a, such as the electrode 13a and electrode 13b or the electrode 13h and electrode 13i, for instance.

The detecting unit 22 has two pieces of detector terminals, and turns into such a state that it is connected electrically to each of the electrodes 13a through 13r by way of the connector 14 and wiring 15. However, the detecting unit 22 turns into such a state that it is connected electrically to two pieces of electrodes (paired electrodes) that are different from the two pieces of electrodes, which are selected from out of the electrodes 13a through 13r by means of the later-described connection switching unit 23 and to which the power-supply unit 21 is connected, thereby detecting a voltage that generates between the said paired electrodes. The two electrodes, which are connected to the two detector terminals of this detecting unit 22 simultaneously, are two electrodes that neighbor to each other in the peripheral rim of the pressure-receiving surface 12a, such as the electrode 13c and electrode 13d or the electrode 13m and electrode 13n, for instance.

The connection switching unit 23 connects the two power-source terminals of the power-source unit 21 to two electrodes from out of the electrodes 13a through 13r, and makes it possible to switch the paired electrodes, which connect to the two power-source terminals of the power-source unit 21, one after another sequentially.

Concretely speaking, the connection switching unit 23 switches the connection of the two power-source terminals of the power-source unit 21 to the electrodes pairs in the following order: a first set of electrode pairs (13a, 13b)→a second set of electrode pairs (13b, 13c)→a third set of electrode pairs (13c, 13d)→a fourth set of electrode pairs (13d, 13e)→a fifth set of electrode pairs (13e, 13f)→a sixth set of electrode pairs (13f, 13g)→a seventh set of electrode pairs (13g, 13h)→an eighth set of electrode pairs (13h, 13i)→a ninth set of electrode pairs (13i, 13j)→a tenth set of electrode pairs (13j, 13k)→an eleventh set of electrode pairs (13k, 13m)→a twelfth set of electrode pairs (13m, 13n)→a thirteenth set of electrode pairs (13n, 13p)→a fourteenth set of electrode pairs (13p, 13q)→a fifteenth set of electrode pairs (13q, 13r)→a sixteenth set of electrode pairs (13r, 13a).

Further, the connection switching unit 23 connects the two detector terminals of the detecting unit 22 to two electrodes from out of the electrodes 13a through 13r, and makes it possible to switch the paired electrodes, which connect to the two detector terminals of the detecting unit 22, one after another sequentially. However, the connection switching unit 23 makes the connections so that two electrodes, which connect to the two power-source terminals of the power-supply unit 21, differ always from two electrodes, which connect to the two detector terminals of the detecting unit 22.

For example, when the two power-source terminals of the power-supply unit 21 connect to the electrode pairs (13a, 13b), the connection switching unit 23 switches the connection of the two detector terminals of the detecting unit 22 to the electrodes pairs in the following order: the third set of electrode pairs (13c, 13d)→the fourth set of electrode pairs (13d, 13e)→the fifth set of electrode pairs (13e, 13f)→the sixth set of electrode pairs (13f, 13g)→the seventh set of electrode pairs (13g, 13h)→the eighth set of electrode pairs (13h, 13i)→the ninth set of electrode pairs (13i, 13j)→the tenth set of electrode pairs (13j, 13k)→the eleventh set of electrode pairs (13k, 13m)→the twelfth set of electrode pairs (13m, 13n)→the thirteenth set of electrode pairs (13n, 13p) →the fourteenth set of electrode pairs (13p, 13q)→the fifteenth set of electrode pairs (13q, 13r). And, when the two power-source terminals of the power-supply unit 21 are connected to other electrodes, it likewise connects the two detector terminals of the detecting unit 22 to the other electrodes.

That is, the connection switching unit 23 connects the two power-source terminals of the power-source unit 21 to the electrodes 13a through 13r and connects the two detector terminals of the detecting unit 22 to them in combinations of 208 ways in total.

The sensitivity-matrix memory unit 24 memorizes a sensitivity matrix $S_{m,n,x,y}$, which comprises a Jacobian matrix. This sensitivity matrix $S_{m,n,x,y}$ has been computed in advance based on voltages that are detected from the detecting unit 22 when no external force is applied to the pressure-receiving surface 12a, and when a predetermined alternate current is supplied from the power-source unit 21 to the electrodes 13a through 13r.

Concretely speaking, in computing the sensitivity matrix $S_{m,n,x,y}$, a large number of voltages are used, voltages which the detecting unit 22 detects for each of the conditions that arise when the connection switching unit 23 switches the connections between the two power-source terminals of the power-source unit 21 and the electrodes 13a through 13r as well as the connections between the two detector terminals of the detecting unit 22 and the electrodes 13a through 13r one after another sequentially. And, based on the detected results, the sensitivity matrix $S_{m,n,x,y}$ is computed by means of equation (4). In other words, it is possible to calculate the values of the elements of the sensitivity matrix $S_{m,n,x,y}$ in those regions by integrating inner products between $\nabla\phi_m$ and $\nabla\phi_n$ in the respective regions. Note that it is possible to calculate the $\nabla\phi_m$ and $\nabla\phi_n$ by means of a software for partial-differential-equation analysis. Moreover, note that the sensitivity matrix $S_{m,n,x,y}$ is computed herein after extracting only the elements of the electric resistivity, elements which result from the real-number elements after Fourier transformation, in advance from the detected voltages.

Here, when the paired electrodes, which are connected to the two power-source terminals of the power-source unit 21, and the paired electrodes, which are connected to the two detector terminals of the detecting unit 21, are located at symmetrical positions to each other, the measurements are not independent mutually. Therefore, of the connection combinations of 208 ways in total, with regard to the connection combinations of 104 ways, which exclude one of the counterparts of the combinations that are located at symmetrical positions to each other, the sensitivity matrix $S_{m,n,x,y}$ is computed based on the detected results being obtained by means of the detecting unit 22.

$$S_{m,n,x,y} = \int_a \nabla\phi_m \cdot \nabla\phi_n \, da \quad (4)$$

$S_{m,n,x,y}$: Sensitivity Matrix Comprising Jacobian Matrix $\phi_m$: Voltage Being Produced When Flowing Current to "m"th Number of Paired Electrodes $\phi_n$: Voltage Being Produced When Flowing Current to "n"th Number of Paired Electrodes m: Suffix Designating Electrodes' Position to which Voltage is Applied by means of Power-source Unit 21 n: Suffix Designating Electrodes' Position at which Voltage is Detected by means of Detecting Unit 22 x, y: Digitized Two-Dimensional Coordinate Position in Pressure-Receiving Surface 12a

Figure 8:
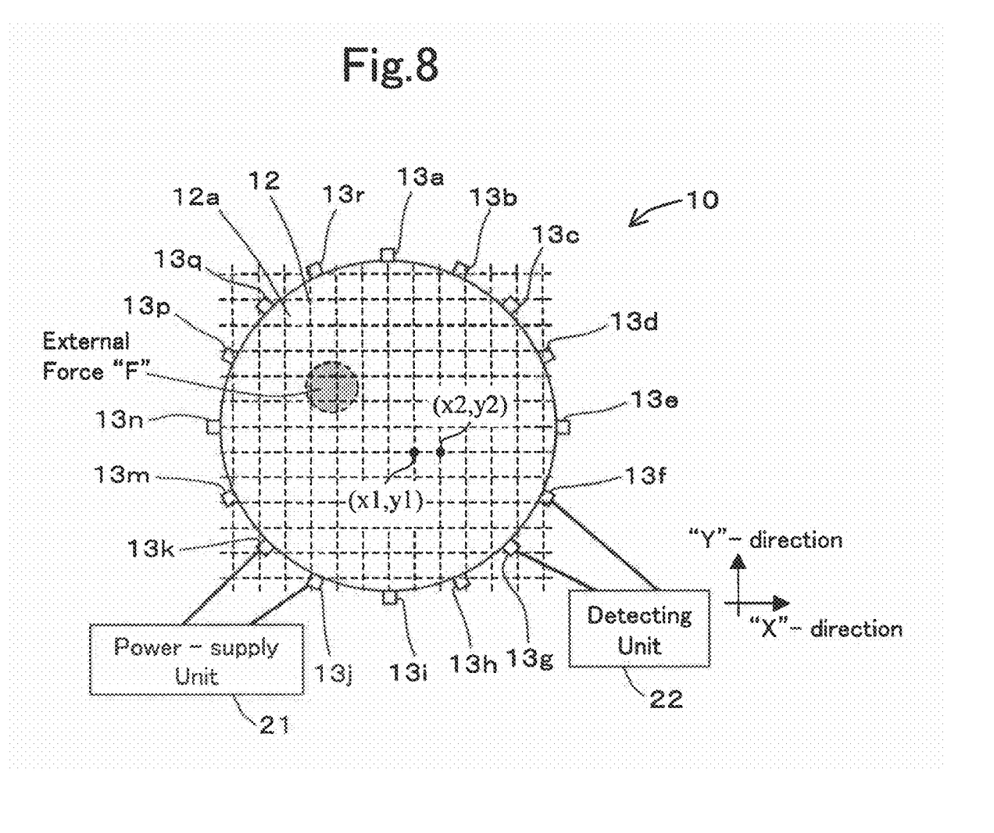
FIG. 8 illustrates a diagram for explaining a controlling unit 20's respective parts.

When the connection switching unit 23 switches the electrodes 13a through 13r that are connected to the power-supply unit 21 and detecting unit 21 so that they are turned into the above-described connected states of 208 ways, the electric-resistivity variation computing unit 25 computes an electric-resistivity variation $\delta\rho(x, y)$, which minimizes an evaluation function J of Equation (5) while satisfying a condition of Equation (6), based on a variation $\delta\rho(m, n)$ of the respective voltages, which the detecting unit 22 has been detected, and based on the sensitivity matrix $S_{m,n,x,y}$, which are memorized in the sensitivity-matrix memory unit 24. For example, it computes the electric-resistivity variations $\delta\rho$ at the coordinate position (x1, y1) and at the coordinate position (x2, y2) in FIG. 8.

$$J = \|\delta V(m,n) - S_{m,n,x,y} \cdot \delta\rho(x,y)\|^2 \quad (5)$$

However, $\delta\rho(x,y) \geq 0 \quad (6)$ $\delta V(m,n)$: Variation of Respective Voltages being Detected by means of Detecting Unit 22

$\delta\rho(x,y)$: Variation of Electric Resistivity of Deformable Sensor 12

$S_{m,n,x,y}$: Sensitivity Matrix Comprising Jacobian Matrix m: Suffix Designating Electrodes' Position to which Voltage is Applied by means of Power-source Unit 21 n: Suffix Designating Electrodes' Position at which Voltage is Detected by means of Detecting Unit 22 x, y: Digitized Two-Dimensional Coordinate Position in Pressure-Receiving Surface 12a

The interpolated-value computing unit 26 computes an interpolated value, which is obtained by linearly interpolating between the electric-resistivity variations $\delta\rho(x, y)$ at neighboring positions, based on the electric-resistivity variations $\delta\rho(x, y)$ that the electric-resistivity variation computing unit 25 has been computed. For example, it computes an interpolated value, which is obtained by linearly interpolating between the coordinate position (x1, y1) and the coordinate position (x2, y2) in FIG. 8.

The external-force position computing unit 27 computes a position in the pressure-receiving surface 12a, position which receives the pressing external force "F," based on the electric-resistivity variations $\delta\rho(x, y)$, which the electric-resistivity variation computing unit 25 has been computed, and based on the interpolated value, which the interpolated-value computing unit 26 has been computed. Here, the electric resistivity of the deformable sensor 12 corresponds to the elastic deformation variation of the deformable sensor 12. That is, as described above, the electric resistivity of the deformable sensor 12 increases monotonically as the elastic deformation variation of the deformable sensor 12 increases. Therefore, when the electric resistivities of the deformable sensor 12 at positions in the pressure-receiving surface 12 have been known, respectively, the external-force position computing unit 27 can compute elastic deformation variations of the deformable sensor 12 at the said positions based on them. By carrying out this operation on all over the entire pressure-receiving surface 12a, it is possible to compute the pressing external force "F" that has been received on the entire pressure-receiving surface 12a.

The outputting unit 28 outputs the position in the pressure-receiving surface 12a, position which receives the pressing external force "F" and which the external-force position computing unit 27 has been computed, to the monitor 30. That is, in the pressure-receiving surface 12a that is displayed on the monitor 30, the outputting unit 28 displays the position, which has received the pressing external force "F," in such a manner that it becomes a different color or color tone with respect to positions, which do not receive the pressing external force "F."

Thus, the deformable sensor system according to the First Example can detect positions of the external force "F" that it has received on the pressure-receiving surface 12a, and can display them.

Figure 9:
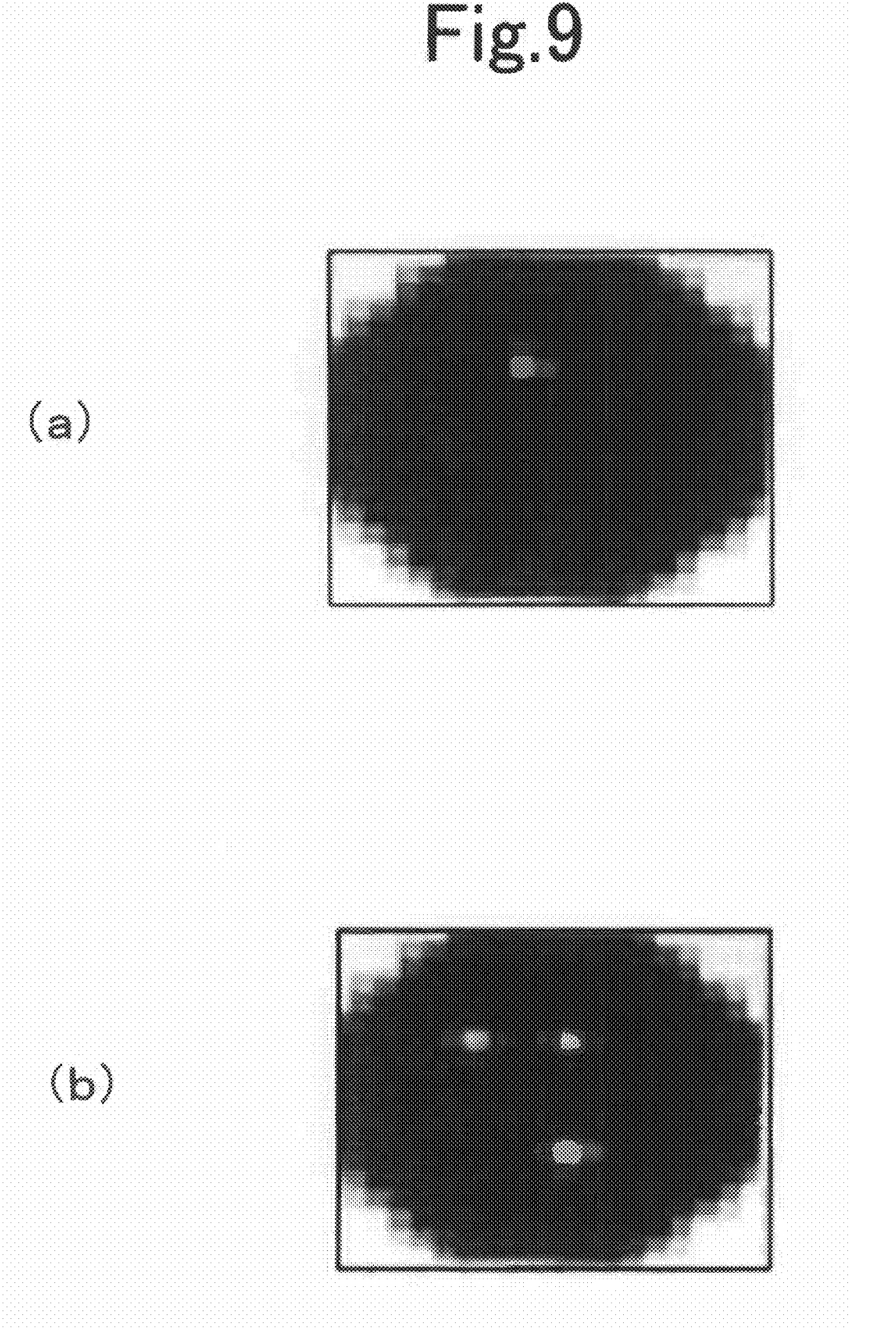
FIG. 9 is a diagram for illustrating results of an experiment.

Here, results that were obtained by actually carrying out an experiment are illustrated in FIG. 9. FIG. 9(a) is a screen that was displayed on the monitor 30 when the pressing external force "F" was applied to one location in the pressure-receiving surface 12a of the deformable sensor 12. FIG. 9(b) is a screen that was displayed on the monitor 30 when the pressing external force "F" was applied to three locations in the pressure-receiving surface 12a of the deformable sensor 12. In FIGS. 9(a) and (b), the white-colored portions are parts, which were displayed as the positions that received the pressing external force "F," and black-colored portions are parts, which were displayed as the positions that did not receive the pressing external force "F." Thus, it is possible to securely display any position either when the pressing external force "F" to be applied to the pressure-receiving surface 12a is applied to one location or when it is applied to a plurality of locations. Note that, although FIGS. 9(a) and (b) are displayed slightly coarsely, it is possible to enhance their resolutions by increasing the number of the electrodes. Note that, even when the number of the electrodes is increased in order to enhance the resolution, the number of the electrodes is extremely less compared with their conventional numbers.

By the way, in carrying out the aforementioned experiment, a computing operation was made based on the method of least squares without imposing the limitation requirement of Equation (6) for comparison. This result became such a display that whites and blacks are arranged in a checkered pattern in the pressure-receiving surface 12a. Therefore, it is believed that the accurate results like those in FIG. 9 could be obtained by imposing the limitation requirement of Equation (6).

Modified Mode of First Example

Figure 10:
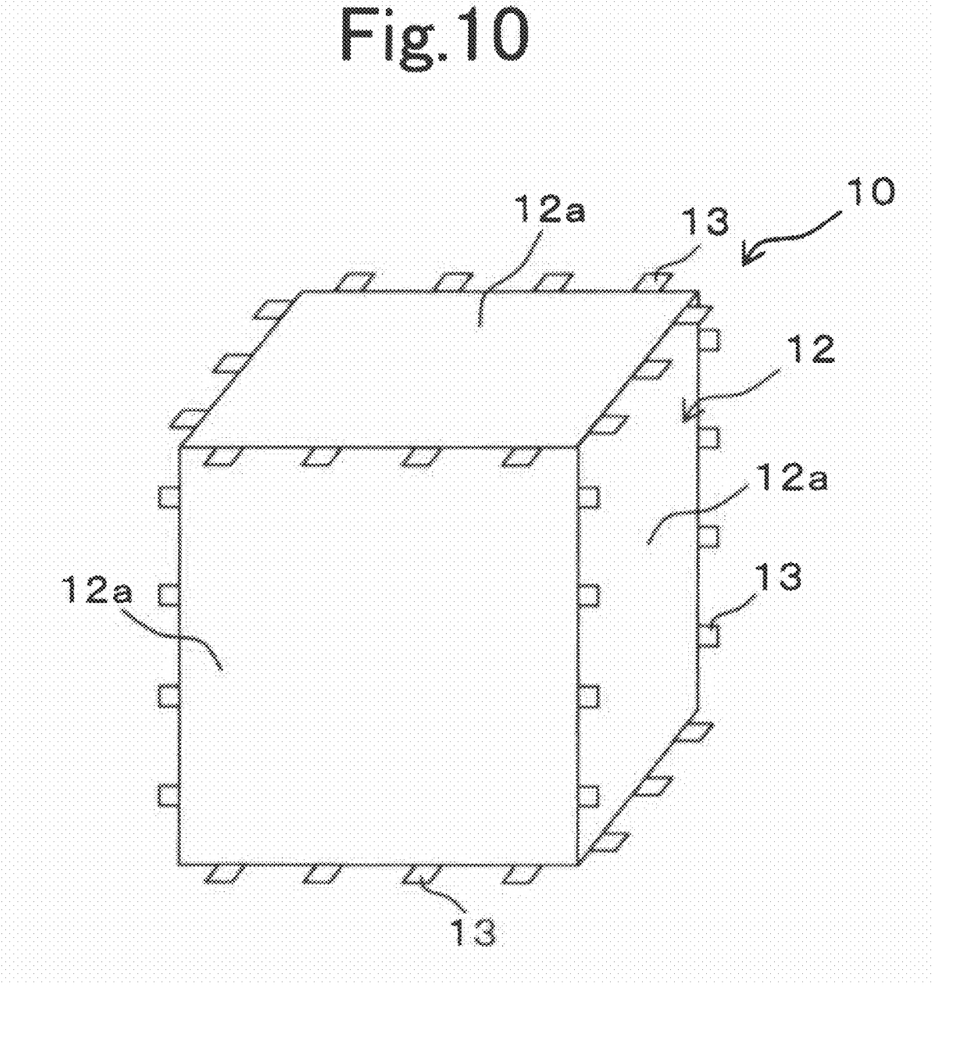
FIG. 10 is a modified mode of a sensor structure 10.

A modified mode of the sensor structure 10, which constitutes the deformable sensor system of the First Example, will be explained with reference to FIG. 10. FIG. 10 is diagram for illustrating the modified mode of the sensor structure 10. Although the deformable sensor 12 was adapted into one that comprises one piece of a circular flat plate alone in the First Example, it is allowable that, as shown in FIG. 10, the deformable sensor 12 can comprise a solid three-dimensionally configured member and can have a plurality of the pressure-receiving surfaces 12a on its faces. In FIG. 10, all of the six faces are adapted into the pressure-receiving surface 12a, respectively. And, the electrodes 13 are disposed in a quantity of a plurality of pieces on the peripheral rim of the respective pressure-receiving surfaces 12a. In this case, it is possible to detect a position in each of the pressure-receiving surfaces 12a, position which receives an external force, and additionally to detect an internal-stress distribution therein. The computing method can be substantially the same as that described above.

Note that, not limited to a rectangular parallelepiped, it is allowable to adapt the pressure-receiving surface 12a into a curved surface; or it is allowable to successively dispose the pressure-receiving surface 12a, which comprises a plurality of curved surfaces; or it is allowable to successively dispose the pressure-receiving surface 12a, which comprises a curved surface, and the pressure-receiving surface 12a, which comprises a flat surface.

Others

In the aforementioned First Example, although the deformable sensor 12 is formed as a circular flat-plated shape; in addition to this, it is allowable to form it as a polygonal flat-plated shape; or it is allowable to form it as a curved surface. Moreover, it is allowable to successively dispose a plurality of the pressure-receiving surfaces 12a on the deformable sensor 12. In this case, a plurality of the electrodes 13 are disposed onto the resultant respective pressure-receiving surfaces 12a.

Moreover, in the aforementioned example, although the power-supply unit 21 supplies an alternate current, it can be done even with a direct current. When the power-supply unit 21 supplies a direct current, the voltages, which the detecting unit 21 detects, are those which are influenced by the components of the deformable sensor 12's electric resistivity. Therefore, in computing the sensitivity matrix $S_{m,n,x,y}$, it is possible to directly extract the components of the electric resistivity alone from out of the voltages, which the detecting unit 22 detects.

Moreover, when the power-supply unit 21 supplies an alternate current, the voltages, which the detecting unit 21 detects, are those which are influenced by the deformable sensor 12's impedance. That is, in this case, it becomes necessary in computing the sensitivity matrix $S_{m,n,x,y}$ to extract the components of the electric resistivity from out of the voltages, which the detecting unit 22 detects, by means of the real-number components after Fourier transformation.

Having now fully described the present invention, it will be apparent to one of ordinary skill in the art that many changes and modifications can be made thereto without departing from the spirit or scope of the present invention as set forth herein including the appended claims.

What is claimed is:

1. A deformable sensor system, comprising:
a deformable sensor having a pressure-receiving surface being capable of receiving external force, and additionally undergoing elastic deformation by means of receiving said external force onto said pressure-receiving surface, and comprising an elastic material whose electric resistivity, when all types of elastic deformations including compression deformation and tensile deformation are caused therein respectively, increases monotonically as an elastic deformation variation in each of the elastic deformation increases;
four or more electrodes being disposed on a peripheral rim of said pressure-receiving surface separately to each other;
a power-source unit for supplying a current between paired electrodes being selected from out of said electrodes;
a detecting unit being connected to paired electrodes being different from said paired electrodes to be connected to said power-source unit and being selected from out of said electrodes, thereby detecting a voltage that arises between the said paired electrodes being connected thereto;
a connection switching unit for switching said paired electrodes, which are connected to said power-source unit, one after another, and for switching said paired electrodes, which are connected to said detecting unit, one after another;
a sensitivity-matrix memory unit for storing a sensitivity matrix $S_{m,n,x,y}$, which has been computed in advance based on said voltage being detected from said detecting unit in the case of not applying said external force to said pressure-receiving surface and in the case of supplying a predetermined current from said power-source unit to said paired electrodes;
an electric-resistivity variation computing unit for computing a variation $\delta\rho(x, y)$ of said deformable sensor's electric resistivity that minimizes an evaluation function J of Equation (1) while satisfying a condition of Equation (2) in the case of applying said external force to a digitized two-dimensional plane-coordinate position (x, y) in said pressure-receiving surface, based on each of said voltages' variations $\delta V(m, n)$, which are detected by means of said detecting unit in the case where said paired electrodes being connected to each other are switched by means of said connection switching unit, and based on said sensitivity matrix $S_{m,n,x,y}$, which is stored in said sensitivity-matrix memory unit; and
an external-force position computing unit for computing a position in said pressure-receiving surface, position which receives said external force, based on said electric-resistivity variation $\delta\rho(x, y)$ being computed by means of said electric-resistivity variation computing unit; wherein $$J = \|\delta V(m,n) - S_{m,n,x,y} \cdot \delta\rho(x,y)\|^2 \quad (1)$$

$$\delta\rho(x,y) \geqq 0 \quad (2)$$

$\delta V(m,n)$: Variation of Respective Voltages being Detected by means of Detecting Unit $\delta\rho(x,y)$: Variation of Electric Resistivity of Deformable Sensor $S_{m,n,x,y}$: Sensitivity Matrix Comprising Jacobian Matrix m: Suffix Designating Electrodes' Position to which Voltage is Applied by means of Power-Source Unit n: Suffix Designating Electrodes' Position at which Voltage is Detected by means of Detecting Unit x, y: Digitized Two-Dimensional Coordinate Position in Pressure-Receiving Surface.

2. The deformable sensor system according to claim 1, wherein:
said deformable sensor system further comprises an interpolated-value computing unit for computing an interpolated value, which is obtained by linearly interpolating between said electric-resistivity variations δρ(x, y) at neighboring positions, based on said electric-resistivity variations δρ(x, y) being computed by means of said electric-resistivity variation computing unit;
wherein said external-force position computing unit computes a position in said pressure-receiving surface, position which receives said external force, based on said electric-resistivity variations δρ(x, y) being computed by means of said electric-resistivity variation computing unit and on said interpolated value being computed by means of said interpolated-value computing unit.

3. The deformable sensor system according to claim 1, wherein:
said paired electrodes, to which said power-source unit connects, are two of said electrodes, which neighbor to each other in the peripheral rim of said pressure-receiving surface; and
said paired electrodes, to which said detecting unit connects, are two of said electrodes, which are different from said paired electrodes being connected to said power-source unit, and which neighbor to each other in the peripheral rim of said pressure-receiving surface.

4. The deformable sensor system according to claim 3, wherein said electrodes are disposed so that distances between said electrodes, which neighbor to each other in the peripheral rim of said pressure-receiving surface, are equal to each other.

5. The deformable sensor system according to claim 1, wherein said deformable sensor comprises a plate-shaped member, and has one or a plurality of said pressure-receiving surfaces in its face.

6. The deformable sensor system according to claim 1, wherein:
said deformable sensor comprises a solid three-dimensionally-shaped member, and has a plurality of said pressure-receiving surfaces in its face; and
said external-force position computing unit computes a position in said pressure-receiving surface, position which receives said external force, and said deformable sensor's internal stress distribution based on said electric-resistivity variations δρ(x, y) being computed by means of said electric-resistivity variation computing unit.

7. The deformable sensor system according to claim 1, wherein said elastic material comprises an elastomer being made up of a predetermined rubber, and spherical conductive fillers being compounded in said elastomer in substantially a single-particulate state and with a high filling rate.

* * * * *